United States Patent
Kim et al.

(10) Patent No.: US 9,969,296 B2
(45) Date of Patent: May 15, 2018

(54) BATTERY MODULE, METHOD FOR MANUFACTURING THE SAME, AND ELECTRIC VEHICLE USING THE SAME

(71) Applicant: LG ELECTRONICS INC., Seoul (KR)

(72) Inventors: Inseok Kim, Seoul (KR); Hyunchang Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/279,602

(22) Filed: Sep. 29, 2016

(65) Prior Publication Data

US 2017/0190264 A1  Jul. 6, 2017

(30) Foreign Application Priority Data

Jan. 5, 2016 (KR) .................. 10-2016-0001183

(51) Int. Cl.
*B60L 11/18* (2006.01)
*H01M 10/42* (2006.01)
(Continued)

(52) U.S. Cl.
CPC ....... *B60L 11/1879* (2013.01); *H01M 2/1061* (2013.01); *H01M 2/1077* (2013.01); *H01M 2/1094* (2013.01); *H01M 10/0481* (2013.01); *H01M 10/425* (2013.01); *H01M 10/482* (2013.01); *H01M 2010/4271* (2013.01); *H01M 2220/20* (2013.01)

(58) Field of Classification Search
CPC ........... B60L 11/1879; H01M 10/0481; H01M 2/1094; H01M 2/1077; H01M 2/1061; H01M 10/425; H01M 10/482; H01M 2220/20; H01M 2010/4271
See application file for complete search history.

(56) References Cited

U.S. PATENT DOCUMENTS

| | | | |
|---|---|---|---|
| 2012/0156537 A1* | 6/2012 | Meintschel | B60L 11/1874 429/99 |
| 2017/0214103 A1* | 7/2017 | Onnerud | H01M 10/658 |

FOREIGN PATENT DOCUMENTS

| | | |
|---|---|---|
| CN | 102230713 | 11/2011 |
| CN | 102472555 | 5/2012 |

(Continued)

OTHER PUBLICATIONS

Chinese Office Action in China Application No. 201480023720.8, dated Apr. 7, 2017, 12 pages (with English translation).

*Primary Examiner* — Stewart A Fraser
(74) *Attorney, Agent, or Firm* — Fish & Richardson P.C.

(57) ABSTRACT

A battery module includes a cell assembly including a lamination of battery cells and expansible members interspersed within the battery cells, the battery cells and the expansible members being laminated in layers along a first direction. The battery module also includes a cell housing enclosing the cell assembly and forming an external appearance of the battery module. The cell housing includes first and second sides corresponding to first and second ends of the laminated layers of the cell assembly along the first direction. The cell housing is configured to fix the first and second ends of the cell assembly to inner surfaces of the first and second sides of the cell housing, respectively, by pressure generated by changes in a thickness of the battery cells and the expansible members along the first direction.

22 Claims, 9 Drawing Sheets

(51) Int. Cl.
    *H01M 10/48*     (2006.01)
    *H01M 2/10*     (2006.01)
    *H01M 10/04*     (2006.01)

(56) References Cited

FOREIGN PATENT DOCUMENTS

| | | |
|---|---|---|
| CN | 202350424 | 7/2012 |
| CN | 102937361 | 2/2013 |
| CN | 202734406 | 2/2013 |
| JP | 2015-185415 | 10/2015 |
| KR | 10-1997-0700382 | 1/1997 |
| KR | 10-2013-0025244 | 3/2013 |
| KR | 10-2015-0005940 | 1/2015 |

\* cited by examiner

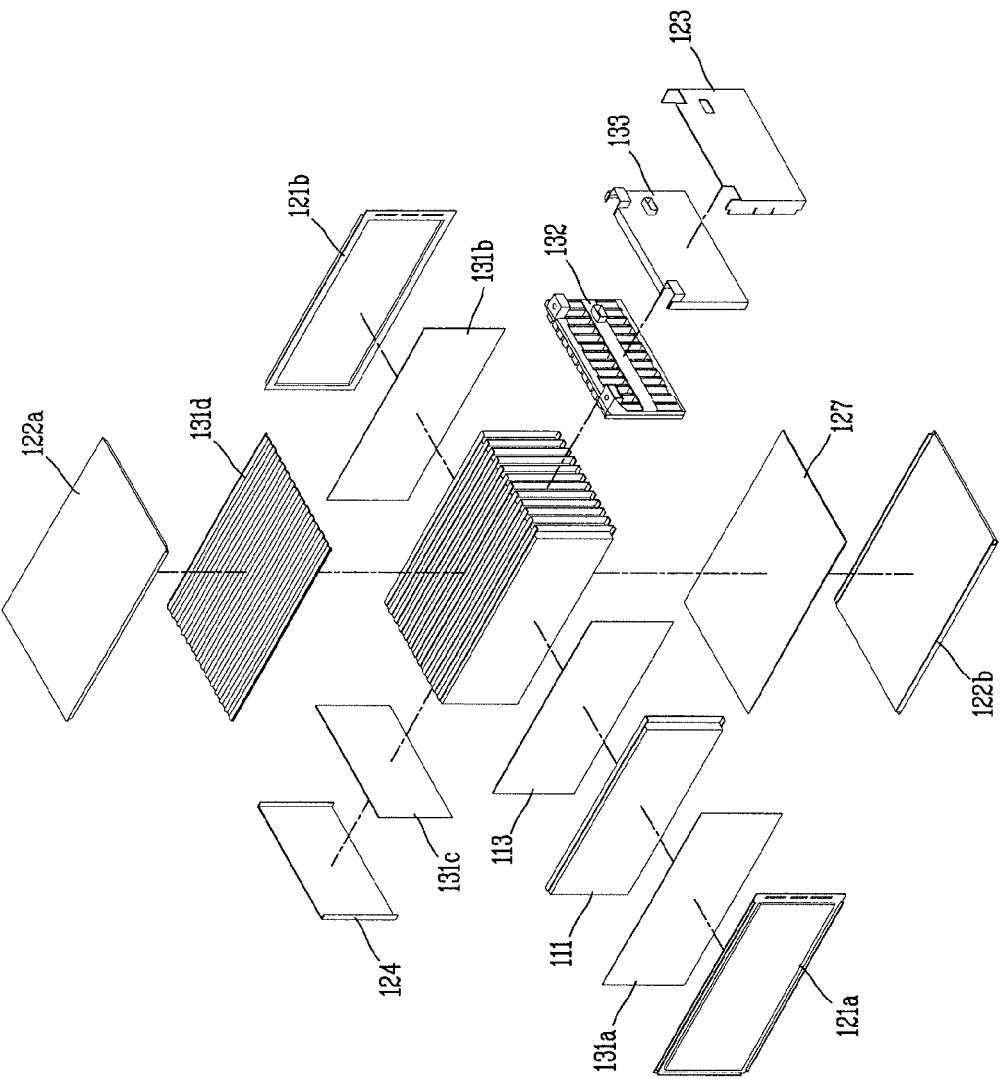

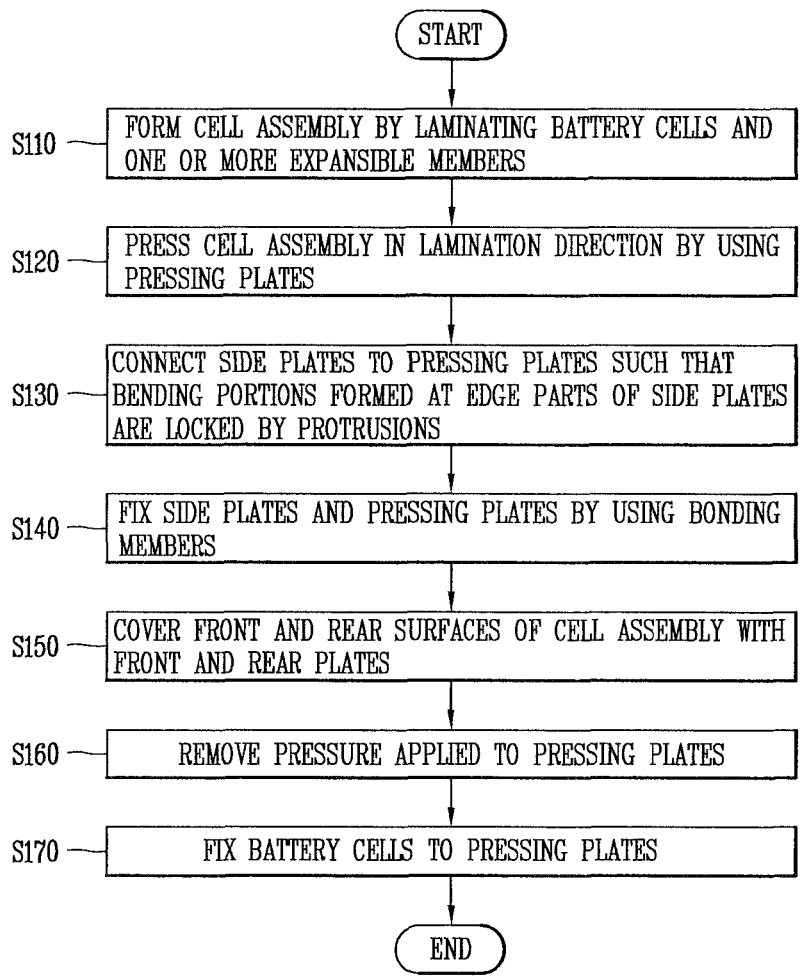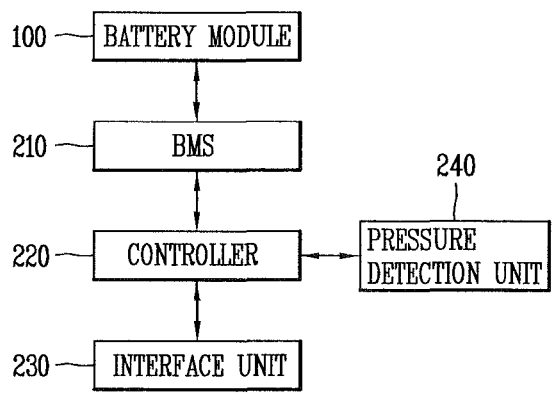

BATTERY MODULE, METHOD FOR MANUFACTURING THE SAME, AND ELECTRIC VEHICLE USING THE SAME

CROSS-REFERENCE TO RELATED APPLICATION

Pursuant to 35 U.S.C. § 119(a), this application claims the benefit of an earlier filing date and right of priority to Korean Patent Application No. 10-2016-0001183, filed on Jan. 5, 2016, the contents of which are incorporated by reference herein in its entirety.

TECHNICAL FIELD

The present disclosure relates to a battery module, and more particularly, to an assembly method of a battery module used in an electric vehicle in a novel manner.

BACKGROUND

Generally, a vehicle is a machine capable of running by using a motor as a power source, capable of carrying persons or freights, or capable of executing various types of functions. A vehicle may be classified according to a motor type. For example, a vehicle may be classified as a gasoline vehicle using a gasoline engine as a motor, a diesel vehicle using a diesel engine as a motor, a liquefied petroleum gas (LPG) vehicle using liquefied petroleum gas as fuel, a gas turbine vehicle using a gas turbine as a motor, or an electric vehicle (EV) using a motor and using electricity charged in a battery. In case of a vehicle using a fossil fuel such as gasoline, diesel, or LPG, environment pollution due to exhausted gas may be caused and petroleum resources may be exhausted.

Accordingly, electric vehicles using electricity as a driving power are being considered. An electric vehicle adopts a driving motor which obtains driving power by receiving electricity from a battery. As compared to an engine which obtains driving power by using fossil fuel such as gasoline or diesel, an electric vehicle does not cause discharge of carbon oxide. Thus, electric vehicles have been spotlighted as eco-friendly vehicles. Recently, electric vehicles have been being rapidly developed due to high oil prices and reinforced regulations on exhaustion gas.

SUMMARY

Systems and techniques are described herein that enable a battery module having a plurality of battery cells interspersed with expansible members configured to absorb and compensate for expansions in thickness of the battery cells that arise during operation.

In one aspect, a battery module includes a cell assembly having a lamination of a plurality of battery cells and one or more expansible members interspersed within the plurality of battery cells, the plurality of battery cells and the one or more expansible members being laminated in layers along a first direction. The battery module also includes a cell housing enclosing the cell assembly and forming an external appearance of the battery module, the cell housing including a first side that corresponds to a first end of the laminated layers of the cell assembly, and a second side that corresponds to a second end of the laminated layers of the cell assembly along the first direction. The cell housing is configured to fix the first end and the second end of the cell assembly to inner surfaces of the first side and the second side of the cell housing, respectively, through pressure generated by a change in a thickness of the plurality of battery cells and the one or more expansible members along the first direction.

In some implementations, the plurality of battery cells are longitudinally arranged along a second direction that is perpendicular to the first direction. The cell housing includes a first pressing plate and a second pressing plate covering the first end and the second end of the cell assembly, respectively. The cell housing also includes a first side plate and a second side plate covering a first side surface and a second side surface of the cell assembly respectively, and arranged perpendicular to a third direction that is perpendicular to both the first direction and the second direction, wherein the first and second side plates are locked by edge parts of the first and second pressing plates. The cell housing further includes a front plate and a rear plate covering a first longitudinal end and a second longitudinal end of the cell assembly, respectively, and arranged in a direction that is perpendicular to the second direction, wherein the front and rear plates are locked by edge parts of the first and second pressing plates and by edge parts of the first and second side plates.

In some implementations, the battery module further includes protrusions that are formed on the first and second pressing plates of the cell housing and that protrude in the first direction, and bending portions that are formed on the first and second side plates and on the rear plate of the cell housing, and that are configured to be locked by the protrusions such that the first and second pressing plates are coupled to the first and second side plates and to the rear plate.

In some implementations, the protrusions are formed along the edge parts of the first and second pressing plates, and the bending portions are formed along the edge parts of the first and second side plates and along edge parts of the rear plate.

In some implementations, one or more thermal pads are provided between the cell assembly and at least one of the first side plate or the second side plate of the cell housing.

In some implementations, the one or more expansible members are laminated in an alternating manner with the plurality of battery cells, and include a foamed member that is contractible and expandable according to an applied pressure.

In some implementations, recess portions are formed in the protrusions of the first and second pressing plates of the cell housing, and are recessed inward toward the cell assembly, the recess portions configured to receive end portions of the bending portions of the first and second side plates. In addition, chamfers are formed on the first and second pressing plates, the chamfers forming an incline that extend outward from the recess portions and away from the cell assembly.

In some implementations, bonding members are provided between the bending portions and the chamfers, the bonding members configured to fix the first and second side plates to the first and second pressing plates.

In some implementations, insulation sheets are disposed between the cell assembly and the cell housing, the insulation sheets configured to provide electrical insulation for the cell assembly from an outside of the cell assembly.

In some implementations, the plurality of battery cells and the one or more expansible members in the cell assembly are arranged as a plurality of cartridges, each cartridge having a first battery cell, a second battery cell, and an expansible member disposed between the first and second battery cells.

In some implementations, the one or more expansible members have contractible thickness along the first direction, and the plurality of battery cells have expandable thickness along the first direction, and an increase in the expandable thickness of the plurality of battery cells is compensated by a corresponding decrease in the contractible thickness of the one or more expansible members.

In some implementations, the contractible thickness of the one or more expansible members has a range of 20~80% of a nominal thickness.

In another aspect, a method of manufacturing a battery module includes: (a) forming a cell assembly by laminating a plurality of battery cells and one or more expansible members in layers along a first direction; (b) applying an inward pressure to the cell assembly along the first direction by using pressing plates; (c) coupling, to the pressing plates and in the pressed state of the cell assembly, side plates that are provided on side surfaces of the battery cells; (d) removing the pressure applied to the cell assembly; and (e) fixing the plurality of battery cells to the pressing plates through an outward pressure generated by a change in thickness of the plurality of battery cells and the one or more expansible members along the first direction.

In some implementations, the plurality of battery cells and the one or more expansible members are laminated in an alternating manner along the first direction.

In some implementations, the one or more expansible members have contractible thickness along the first direction, the plurality of battery cells have expandable thickness along the first direction, and an increase in the expandable thickness of the plurality of battery cells is compensated by a corresponding decrease in the contractible thickness of the one or more expansible members. The contractible thickness of the one or more expansible members has a range of 20~80% of a nominal thickness.

In some implementations, the method further includes covering a front surface and a rear surface of the cell assembly with a front plate and a rear plate, respectively.

In some implementations, operation (c) further includes forming protrusions at edge parts of the pressing plates, the protrusions configured to protrude toward away from the cell assembly; forming bending portions at edge parts of the side plates; and locking the bending portions of the side plates to the protrusions of the pressing plates.

In some implementations, operation (c) further includes forming recess portions in the protrusions of the pressing plates, the recess portions being recessed inward toward the cell assembly; forming chamfers on the pressing plates, the chamfers forming an incline that extend outward from the recess portions and away from the cell assembly; and forming bonding members between the bending portions and the chamfers, the bonding members fixing the side plates to the pressing plates.

In some implementations, the side plates are thermal plates configured to discharge heat occurring from the battery cells to an outside of the cell assembly.

In some implementations, coupling the pressing plates to the side plates in operation (c) includes sliding the side plates in an engaged state to edge parts of the pressing plates.

In some implementations, operation (c) further includes inserting the thermal plates into the side plates.

In another aspect, an electric vehicle includes a battery module having a lamination of a plurality of battery cells and one or more expansible members interspersed between the plurality of battery cells, the plurality of battery cells and the one or more expansible members being laminated in layers along a first direction. The electric vehicle also includes a pressure detection unit connected to the battery module, and configured to measure a pressure inside the battery module. The electric vehicle further includes a controller configured to determine a state of the battery module based on the pressure detected by the pressure detection unit; and an interface unit configured to display the state of the battery module determined by the controller. The controller is further configured to: detect that the pressure inside the battery module detected by the pressure detection unit exceeds a threshold; and based on a detection that the pressure inside the battery module exceeds the threshold, limit an operation of the battery module, perform a diagnosis of the battery module, and display a diagnosis result on the interface unit.

Further scope of applicability of the present disclosure will become more apparent from the detailed description given hereinafter. However, it should be understood that the detailed description and specific examples, while indicating preferred implementations, are given by way of illustration only, and various changes and modifications will become apparent.

BRIEF DESCRIPTION OF THE DRAWINGS

FIG. 2 is a diagram illustrating an example of an entire exploded perspective view of a battery module according to an implementation;

FIG. 7 is a flowchart illustrating an example of an assembly order of a battery module according to an implementation; and FIG. 8 is a block diagram illustrating an example of an inner structure of an electric vehicle according to an implementation.

DETAILED DESCRIPTION

Electric vehicles that utilize a plurality of battery cells in a battery may suffer from various challenges. For example, the battery may suffer a negative impact on performance because the battery cells may undergo physical expansion caused by heat generated during operation.

Systems and techniques are described herein that enable a battery module and a method of manufacturing a battery module that provides a more stable, secure, and efficient battery cell assembly despite possible swelling of battery cells. In particular, a battery module described herein includes a cell assembly that has a lamination of battery cells and expansible members interspersed between the battery cells. The expansible members are configured to contract and thereby compensate for potential swelling of battery cells. In addition, the battery module includes a housing around the cell assembly that leverages both the expansible members and any potential swelling of the battery cells to advantageously provide a more stable and easily-assembled structure of the housing.

In some implementations, the battery module may be provided with a housing that surrounds the cell assembly. The housing is configured to be assembled in a more efficient and convenient manner by leveraging a repulsive force generated by the expansible member, the repulsive force being generated when the battery cells are initially pressed during manufacture. Furthermore, during operation of the battery module, the housing is configured to leverage possible thermal expansion of the battery cells to maintain a more stable coupling of the housing.

In addition, in some implementations, the battery module may be assembled more simply by using extruded plates having high dimensional accuracy.

Furthermore, in some implementations, the battery module may be assembled more simply without necessarily using a coupling method such as welding.

Description will now be given in detail of some example configurations of a battery module, a method of manufacturing the battery module, and an electric vehicle using the same, with reference to the accompanying drawings.

Figure 1:
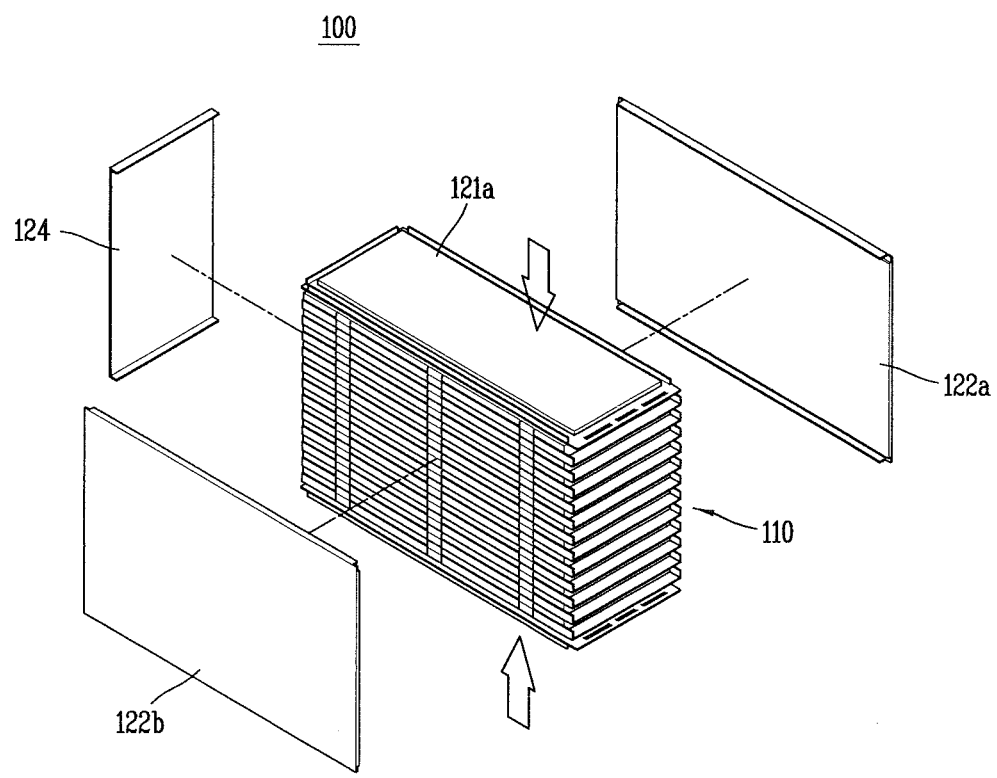
FIG. 1 is a diagram illustrating an example of a perspective view of a battery module according to an implementation.

FIG. 1 illustrates a schematic exploded perspective view of an example of a battery module 100, and FIG. 2 illustrates an entire exploded perspective view of the battery module 100.

Referring to FIGS. 1 and 2, a battery module 100 according to some implementations includes a cell assembly 110 having one or more battery cells 111 and having one or more expansible members 113 provided between the battery cells, and a cell housing configured to accommodate the cell assembly 110 therein.

During operation, the battery cells 111 of the cell assembly 110 may have an increased thickness due to swelling occurring as a usage time is increased. The expansible member 113 is configured to compensate for the increased thickness of the battery cells 111. That is, as the battery module 100 is used in operation, the battery cells 111 start to swell. In some implementations, in order to prevent such swelling, heat radiation may be absorbed by using one or more thermal pads 127, etc. However, such configurations have limitations and may not sufficiently mitigate the swelling of the battery cells 111.

The expansible member 113 is inserted between the battery cells 111 so as to absorb an increased thickness caused by an expansive force of the battery cells 111. As such, the expansible member 113 may provide attenuation of the increased thickness of the battery cells 111 and provide more stable coupling of the battery module 100. Accordingly, an entire thickness of the battery module 100 may be sufficiently maintained without expansion. In some implementations, the battery cells 111 and the expansible members 113 may be laminated as a stack of layers along a direction of lamination (a first direction). The combined thickness of the battery cells 111 and the expansible members 113 may therefore form an overall thickness of the stack along the lamination direction (the first direction).

During operation, the plurality of battery cells 111 and the expansible members 113 may undergo a change in thickness in the direction of the lamination (the first direction). The change in thickness of the expansible members 113 may counteract the change in thickness of the battery cells 111 so as to maintain an overall thickness of the stack. More specifically, during operation, the battery cells 111 may undergo an increased thickness in the lamination direction, whereas the expansible members 113 may be configured to undergo a decreased thickness in the lamination direction. As the thickness change of the battery cells 111 and the thickness change of the expansible members 113 are executed in a compensating manner, the entire thickness of the battery module 100 may be constantly maintained.

The expansible member 113 may be a member that is expandable or contractible within a range of a nominal thickness. For example, in some implementations, the expansible member 113 may be expandable or contractible within a range of 20% to 80% of a nominal thickness. The nominal thickness may be a thickness of the expansible member 113 that is not subject to external pressure by the battery cells. The expansion ratio of the expansible member 113 refers to the range of thickness that is variable according to a change of an external pressure. If a pressure applied to the expansible member 113 is increased, the expansible member 113 has a decreased thickness to absorb an expansive force of the battery cells 111 due to swelling. However, if an excessive pressure is applied to the expansible member 113, then the expansible member 113 may lose its elasticity (contractility) and become less effective.

FIGS. 3A to 3F illustrate examples of an assembly order of the battery module 100, and FIG. 7 is a flowchart illustrating an example of an assembly order of the battery module 100.

Hereinafter, an example of a method of manufacturing a battery module will be explained with reference to FIGS. 3A to 3F and FIG. 7.

Figure 3A:
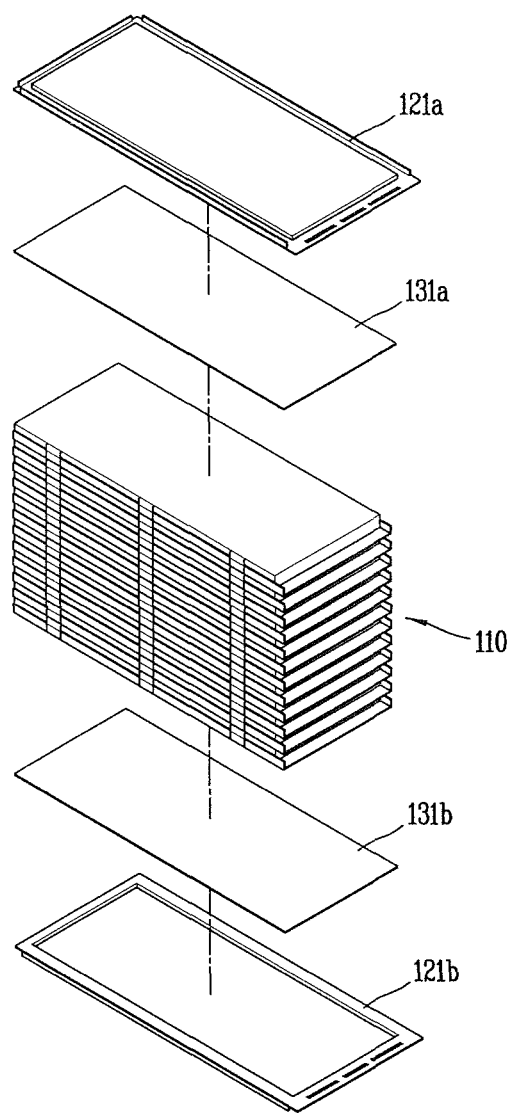
FIGS. 3A to 3F are diagrams illustrating examples of an assembly order of a battery module according to an implementation.

As shown in FIG. 3A, a cell assembly 110 is formed as a plurality of battery cells 111 and one or more expansible members 113 that are alternately laminated on each other (corresponding to operation S110 in FIG. 7). In particular, the cell assembly 110 is formed by a lamination in a first direction along which the battery cells 111 and expansible members 113 are layered. That is, referring to the example of FIG. 3A, the lamination direction (first direction) is along a vertical direction. In addition, a direction that is perpendicular to the first direction and along a longitudinal direction of the battery cells 111 is referred to as a second direction. A pair of pressing plates 121a and 121b are disposed above and below the cell assembly 110 to press the cell assembly 110 from the outside (operation S120 in FIG. 7).

Insulation sheets 131a and 131b are provided on an upper end and a lower end of the cell assembly 110, so as to electrically-insulate the cell assembly 110 from the outside. As shown in FIG. 3A, the insulation sheets 131a and 131b are provided on the upper end and the lower end of the cell assembly 110, and the pair of pressing plates 121a and 121b (i.e., the first and second pressing plates) are disposed on the outermost sides.

Figure 3B:
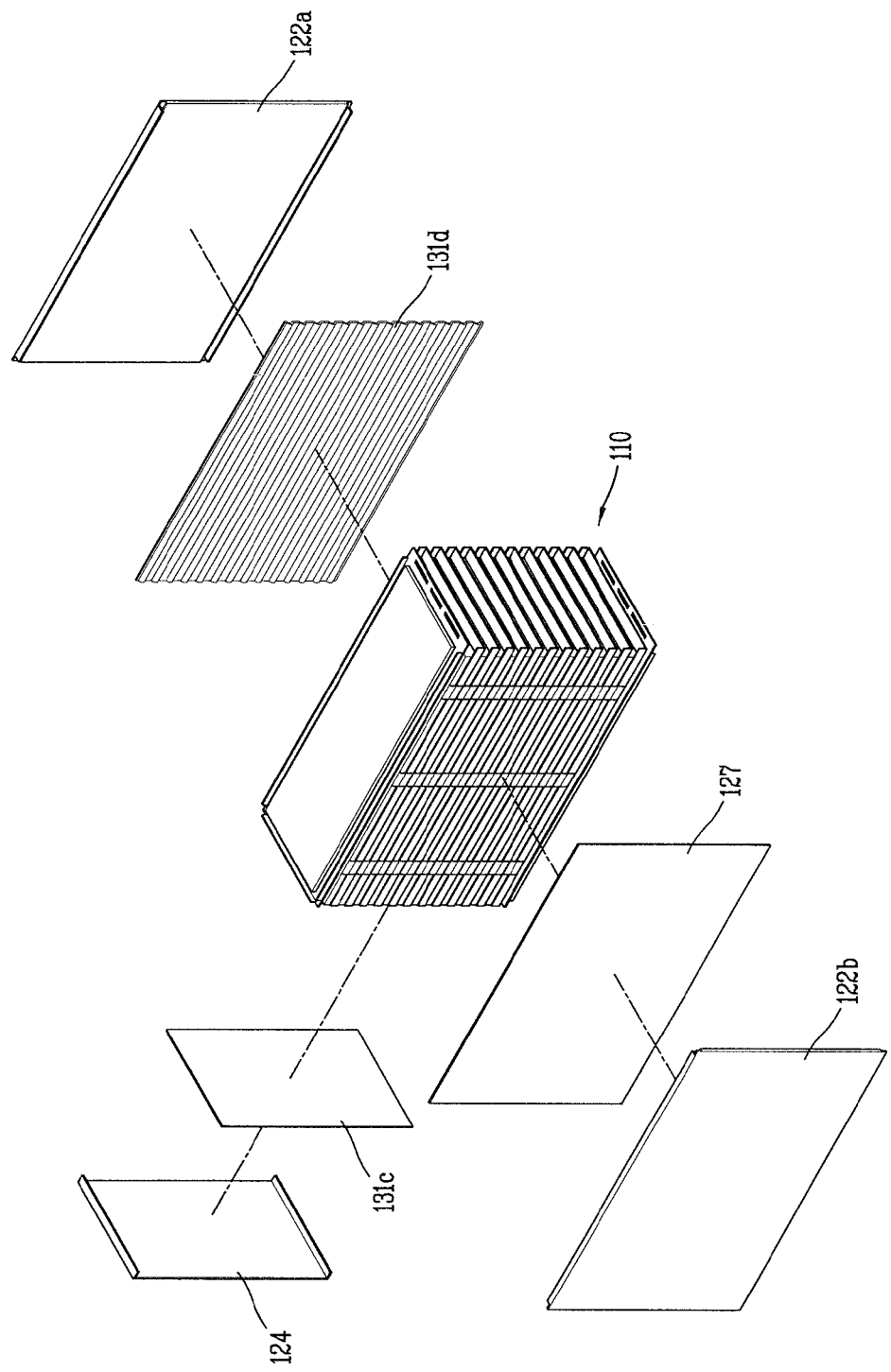

The first and second pressing plates 121a and 121b affix the cell assembly 110 together with other plates. For example, as shown in FIG. 3B, the first and second pressing plates 121a and 121b are fixed together with a pair of side plates 122a and 122b and a rear plate 124. In this case, the pair of side plates 122a and 122b are formed to be perpendicular to a third direction that is perpendicular to the second direction.

Figure 3C:
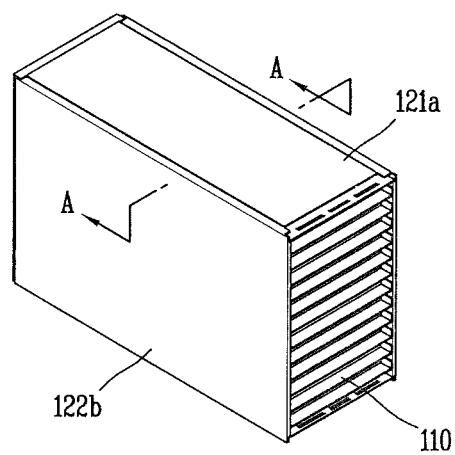

FIG. 3C illustrates a fixed state of the cell assembly 110 obtained by coupling the first and second pressing plates 121a and 121b to the pair of side plates 122a and 122b and the rear plate 124.

Figure 3D:
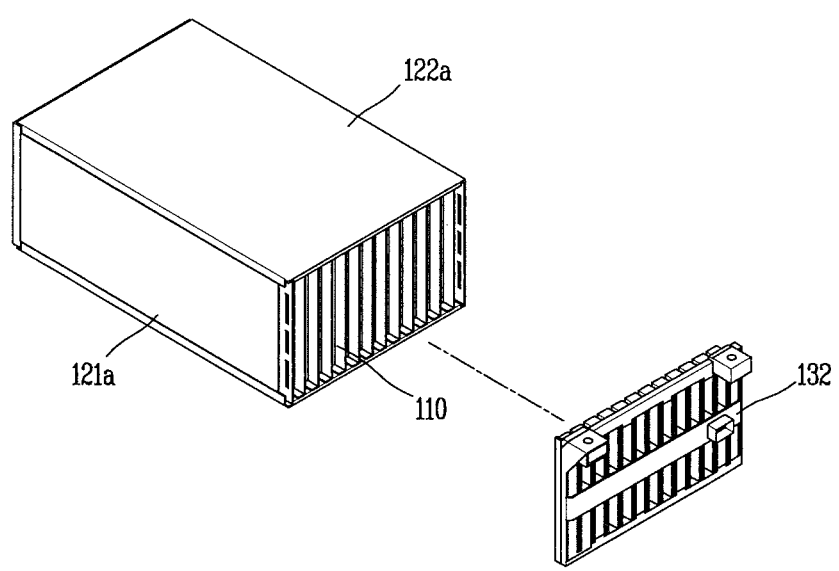
Figure 3E:
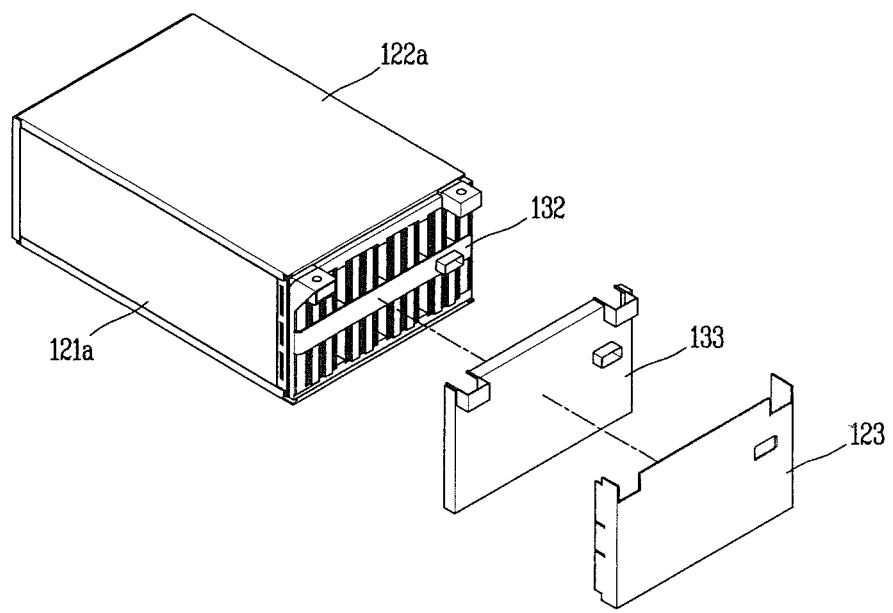

FIGS. 3D and 3E illustrate an example of a wire portion 132 and a wire portion cover 133 that are provided between the front plate 123 and the cell assembly 110. The wire portion 132 is connected to an electrode of the battery cells 111, thereby connecting the plurality of battery cells 111 to each other in parallel or in series. The wire portion 132 is formed to be electrically connected to the electrode of the battery cells 111, and includes a printed circuit board (PCB).

Figure 3F:
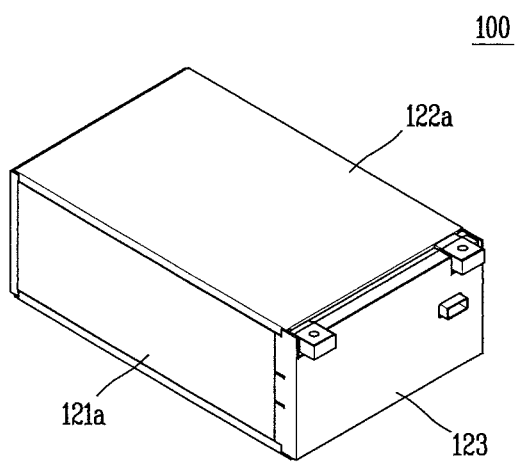

FIG. 3F illustrates an assembled example of the battery module 100, with the front plate 123 affixed.

Figure 4:
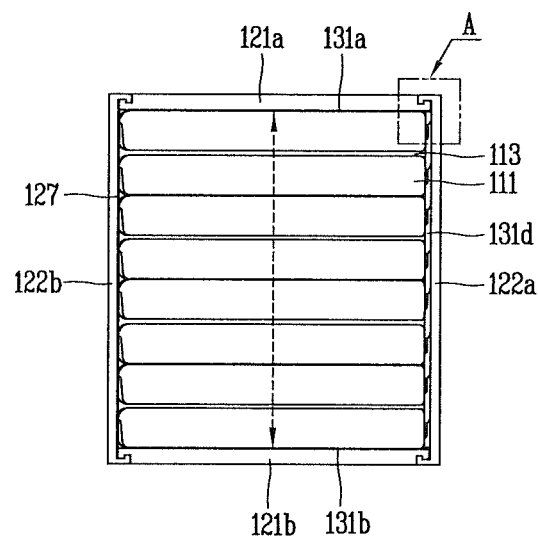
FIG. 4 is a diagram illustrating an example of a sectional view taken along the line 'AA' in FIG. 3C.
Figure 5:
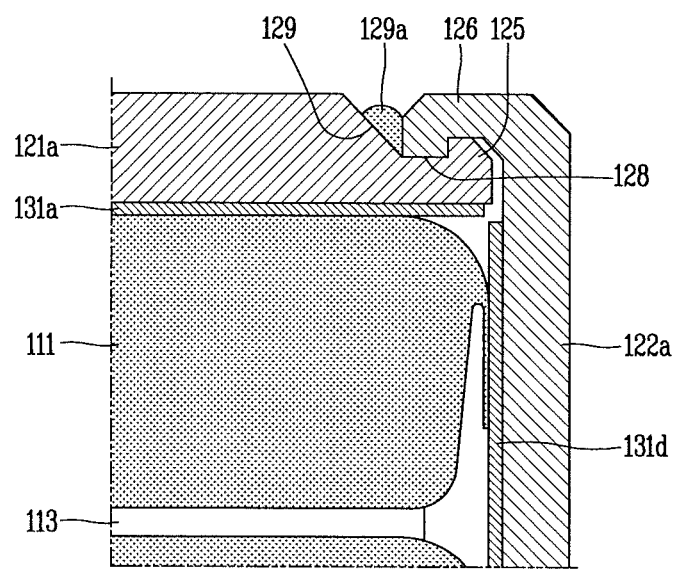
FIG. 5 is a diagram illustrating an example of an enlarged view of part 'A' in FIG. 4.

FIG. 4 illustrates a sectional view showing the interior of the battery module 100 taken along line 'AA' in FIG. 3C, and FIG. 5 is an enlarged view of part 'A' in FIG. 4. Referring to FIGS. 4 and 5, the pair of side plates 122a and 122b (i.e., the first and second side plates) are coupled to two ends of each of the first and second pressing plates 121a and 121b (operation S130 in FIG. 7).

In some implementations, as shown in FIG. 1, an initial pressure is applied to the cell assembly 110, corresponding to the downward arrow shown in FIG. 1. The initial pressure creates a coupled state of the first and second pressing plates 121a, 121b with the first and second side plates 122a, 122b and the rear plate 124 (operation S160 in FIG. 7). The initial pressure creates a contraction in the expansible members 113.

Once the initial pressure is removed, as shown in FIG. 4, the contracted expansible member 113 becomes expanded and generates a force pressing against the first and second pressing plates 121a, 121b, represented by the vertical arrows in FIG. 4. As a result, the battery cells 111 become adhered to the first and second pressing plates 121a, 121b (operation S170 in FIG. 7).

FIG. 5 illustrates an example of structures that provide easy coupling of the pressing plates 121a, 121b with the side plates 122a, 122b. A similar configuration is provided that securely couples the pressing plates 121a, 121b with the rear plate 124. The secure coupling is provided by protrusions 125 that lock into bending portions 126. In particular, in the example of FIG. 5, the protrusion 125 is formed at an edge portion of the first pressing plate 121a and protrudes in the first direction, namely along the direction of layering in the lamination (a vertical direction in FIG. 5). A similar protrusion is provided at an edge part of the second pressing plate 121b.

The bending portion 126 is formed at an edge portion of the first side plate 122a. Similar bending portions are provided at the second side plate 122b and at the rear plate 124. As such, the side plates 122a, 122b and the rear plate 124 enclose the cell assembly 110 by being locked by the protrusions 125. Accordingly, the pressing plates 121a, 121b may be more stably coupled to the first and second side plates 122a, 122b and to the rear plate 124 (operation S130 in FIG. 7).

The configuration of FIG. 5 provides stable coupling of the surrounding plates even during operation of the battery module 100, during which the battery cells 111 may undergo thickness expansion. For example, during operation, the battery cells 111 may expand in thickness and apply outward pressure on the pressing plates 121a and 121b (in a vertical direction in FIG. 5). Despite this outward (vertical) pressure applied on pressing plates 121a, 121b, the pressing plates 121a, 121b may remain stably coupled to the side plates 122a, 122b and to the rear plate 124 due to the protrusions 125 being locked by the bending portions 126, as shown in FIG. 5. As such, because the protrusions 125 protrude in a direction of lamination (vertical direction in FIG. 5) and are inserted into the bending portion 126, an outward pressure applied by the battery cells onto the pressing plates 121a, 121b will serve to more securely couple the pressing plates 121a, 121b to the side plates 122a, 122b and to the rear wall 124.

The protrusions 125 are formed along edge parts of the pressing plates 121a, 121b, while the bending portions 126 are formed along edge parts of the side plates 122a, 122b and along edge parts of the rear plate 124. Furthermore, in some implementations, one or more thermal pads 127 may be provided between at least one of the first or second side plates 122a, 122b and the cell assembly 110, thereby discharging heat that is generated from inside the battery module 100 to the outside. For example, the side plates 122a, 122b may be thermal plates configured to discharge heat generated from the inside of the battery module 100 to the outside. In addition, in some implementations, one or more insulation sheet 131 may be provided between at least one of the side plates 122a, 122b and the cell assembly 110. In some scenarios, the thermal pad 127 itself may also provide an insulation function, in addition or as an alternative to the insulation sheet 131.

Referring to FIG. 5, in some implementations, recess portions 128 that are recessed toward the cell assembly 110 are formed in the protrusions 125 of the pressing plates 121a, 121b. In addition, chamfers 129 may be formed to be inclined from the recess portions 128 toward the outside of the cell assembly 110. Between the bending portions 126, and the chamfers 129 are provided bonding members 129a, which are configured to fix the side plates 122a and 122b to the pressing plates 121a and 121b. The bonding members 129a may be partially or wholly formed between the pressing plates and the side plates (operation S140 in FIG. 7).

Subsequently, a front surface and a rear surface of the cell assembly 110 are covered by the front plate 123 and the rear plate 124, respectively (operation S150 in FIG. 7). The rear plate 124 may simultaneously be coupled to the pressing plates 121a, 121b together with the side plates 122a, 122b. For example, the front plate 123 may be coupled to the pressing plates 121a, 121b by a laser welding.

During operation, if the battery module 100 is used in a completely-assembled state, a thickness of the battery cells 111 may gradually increase as time elapses. For example, the battery cells 111 may undergo an expansion in thickness and thereby contract the expansible member 113 such that the expansible member 113 contracts from an initial thickness of 1 mm in an initial state (i.e., a state before pressurization occurs) to a reduced thickness of 0.8 mm when pressurization occurs. In this case, the expansible member 113 has a deceased thickness, reduced by 0.2 mm.

Therefore, the battery module 100 includes a cell assembly 110 having one or more battery cells 111 laminated in layers along a first direction, and having one or more expansible members 113 provided between the battery cells 111; and a cell housing configured to accommodate the cell assembly 110 therein and forming an appearance of the battery module 100. The cell housing affixes the cell assembly 110 to an inner side surface of the cell housing in the first direction, while an expansive force of the battery cells 111 due to swelling is reciprocally compensated by a contractile force of the expansible member 113.

The expansible member 113 may therefore compensate for swelling (an increased thickness) of the battery cells 111 occurring as the battery module 100 is used in operation. That is, during operation of the battery cells 111, the battery cells 111 may experience an increased temperature, and an increased thickness due to swelling. However, since such an increased thickness is absorbed by the expansible member 113, the battery module 100 may maintain the same overall thickness without having an increased volume. In some implementations, the cell housing may be an injectionmolded plate formed of an aluminum material, although implementations are not limited thereto.

The plurality of battery cells 111 are longitudinally formed along a second direction that is perpendicular to the first direction, e.g., a direction perpendicular to the first direction. In some implementations, the cell housing includes the aforementioned plurality of plates 121a, 121b, 122a, 122b, 123, and 124. The first and second pressing plates 121a, 121b cover an upper surface and a lower surface of the cell assembly 110. The first and second side plates 122a, 122b are formed to be perpendicular to a third direction that is perpendicular to the first and second directions, and cover two side surfaces of the cell assembly 110, and are locked by edge parts of the first and second pressing plates 121a, 121b. The front and rear plates 123, 124 are locked by edge parts of the first and second pressing plates 121a, 121b and the first and second side plates 122a, 122b, and are formed in a direction perpendicular to the second direction, and formed to cover the cell assembly 110.

Although an example of the cell housing has been described above, implementations are not limited thereto. In some implementations, the cell housing may be formed in pairs of plates that cover front and rear surfaces, right and left surfaces, or upper and lower surfaces of the cell assembly 110. Alternatively, the cell housing may be formed to cover only one surface of the cell assembly 110.

The expansible member 113 may be laminated as layers in an alternating manner with the battery cells 111, and may be implemented as a foamed member which is contractible and expandable according to an applied pressure. For example, the expansible member 113 may be formed of urethane, although implementations are not limited thereto.

Although in the foregoing descriptions, the plurality of expansible members 113 and the battery cells 111 are laminated in an alternating manner, implementations are not limited to such a structure, and any suitable number of battery cells 111 may be laminated between successive expansible members 113. For example, two battery cells 111 may be laminated on each other, and one expansible member 113 may be laminated on the two battery cells 111. A thickness of the overall cell assembly 110 may be controlled by the number of expansible members 113. The overall thickness of the cell assembly 110 may also be controlled by a thickness of each expansible member 113. Furthermore, in some scenarios, an air gap, which occurs when the cell assembly 110 and the pressing plates 121a, 121b are coupled to each other, may be controlled by the expansible member 113.

In some implementations, as shown in FIGS. 4 and 5, insulation sheets 131a, 131b, 131c, and 131d may be disposed between the plates (i.e., the pressing plates 121a, 121b, the side plates 122a, 122b, and the front and rear plates 123, 124) and the cell housing. The insulation sheets 131a, 131b, 131c, 131d may be configured to provide electrical insulation for the cell assembly 110 from the outside.

Figure 6:
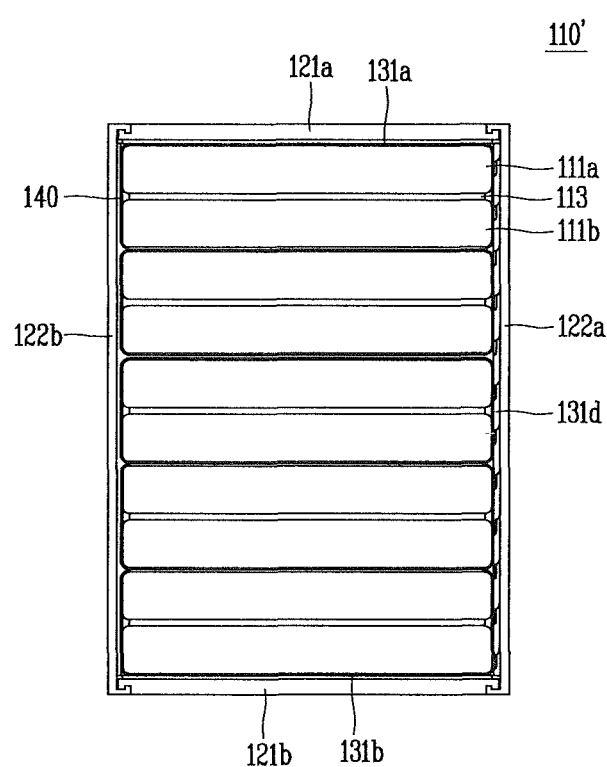
FIG. 6 is a diagram illustrating an example of a sectional view of a battery module according to another implementation.

FIG. 6 illustrates an example of a sectional view of an interior of a battery module according to another implementation.

Referring to the example of FIG. 6, the cell assembly 110 includes a plurality of cartridges 140, each cartridge 140 having first and second battery cells 111a, 111b and having an expansible member 113 disposed between the first and second battery cells 111a, 111b. Therefore, in implementations such as those shown in FIG. 4, the cell assembly 110 may be formed by laminating groups on each other, each group composed of one battery cell 111 and one expansible member 113.

Alternatively, in implementations such as those shown in FIG. 6, the cell assembly 110 may be formed by grouping one or more battery cells 111a, 111b and the expansible member 113 as a single cartridge 140, and then by arranging the cartridges 140 in parallel. In the latter scenario, the plates of the cell assembly 110 may have the same or similar structure as or to those in the aforementioned implementations, and thus detailed explanations thereof will be omitted.

Hereinafter, an example of a method of manufacturing the battery module 100 will be explained with reference to FIG. 7.

Firstly, a cell assembly 110 is formed by laminating a plurality of battery cells 111 and one or more expansible members 113 on each other (S110). Then, the cell assembly 110 is pressed in the lamination direction, by using pressing plates 121a, 121b (S120). In the pressed state of the cell assembly 110, side plates 122a, 122b provided on side surfaces of the battery cell 111 are coupled to the pressing plates 121a, 121b (S130). In this case, a rear plate 124 may be simultaneously coupled to the pressing plates 121a, 121b together with the side plates 122a, 122b.

Then, the pressure applied to the pressing plates 121a, 121b is removed (S160). If the initial pressure is removed, the cell assembly 110 undergoes an increased thickness due to an expansive force caused by expansion of the expansible members 113, thereby pressing against the inside of the pressing plates 121a, 121b. As a result, the pressing plates 121a, 121b are stably coupled to and assembled with the side plates 122a, 122b and with the rear plate 124. Such a configuration provides a more stable assembly of the battery module 100.

As such, the expansible members 113 within the cell assembly 110 provide a constant expansive force that maintains a coupling between the pressing plates and the side plates of the housing. In addition to this function, the expansible members 113 also serve to compensate for possible expansion of the battery cells 111 caused by heat during operation of the battery module.

As such, the battery module 100 may maintain a stable coupled state not only during an assembly process, but also during operation after the assembly. That is, if the battery module 100 is used in an electric vehicle, then during operation, the battery cells 111 are adhered to the pressing plates by an expansive force due to swelling of the battery cells 111 (S170). As a result, the battery module 100 is more stably assembled.

After the side plates 122a, 122b are coupled to the pressing plates 121a, 121b, a front surface and a rear surface of the cell assembly 110 may be covered by a front plate 123 and the rear plate 124, respectively (S150). In some implementations, a wire portion 132 and a wire portion cover 133 are provided between the front plate 123 and the cell assembly 110. The wire portion 132 is connected to an electrode of the battery cells 111, thereby connecting the plurality of battery cells 111 to each other in parallel or in series.

The wire portion 132 is formed to be electrically connected to the electrode of the battery cells 111, and includes a printed circuit board (PCB).

As described above, in order to assemble the side plates 122a, 122b and the rear plate 124 with the pressing plates 121a, 121b, protrusions 125 are formed at edge parts of the pressing plates 121a, 121b toward the outside of the cell assembly 110. Bending portions 126 are also formed at edge parts of the side plates 122a, 122b and the rear plate 124, so as to engage in a locked manner to the protrusions 125 (S130). The side plates 122a, 122b slide in an engaged state to the edge parts of the pressing plates 121a, 121b, thereby being easily assembled to the pressing plates 121a, 121b. In this case, the side plates 122a, 122b and the rear plate 124 may be simultaneously coupled to the pressing plates 121a, 121b. Alternatively, the side plates 122a, 122b may be first coupled to the pressing plates 121a, 121b, and then the rear plate 124 may be coupled to the pressing plates 121a, 121b in a sliding manner.

In some implementations, for more enhanced coupling between the pressing plates 121a, 121b and the side plates 122a, 122b, recess portions 128 recessed toward the cell assembly 110 are formed in the protrusions 125. Chamfers 129 are farmed to be inclined from the recess portions 128 toward the outside of the cell assembly 110. In addition, bonding members 129a, configured to fix the side plates 122a, 122b to the pressing plates 121a, 121b, are provided between the protrusions 125 and the chamfers 129 (S140).

In some implementations, once an initial pressure is applied to the pressing plates 121a, 121b, the side plates 122a, 122b are coupled to the pressing plates 121a, 121b. Then, the initial pressure is removed to assemble the battery module 100. For disassembly of the battery module 100, the aforementioned processes are executed in reverse order. That is, if the pressing plates 121a, 121b are re-pressed, the expansible member 113 is contracted to release the coupled state of the pressing plates 121a, 121b with the side plates 122a, 122b and with the rear plate 124. With such a configuration, the battery module 100 may be easily disassembled.

One of the first or second side plates 122a, 122b may be used for heat radiation. For smooth heat radiation, in some implementations a thermal pad 127 may be disposed in one of the first or second side plates 122a, 122b.

The battery module 100 according to some implementations may be used in an electric vehicle.

FIG. 8 is a block diagram schematically illustrating an example of an inner structure of an electric vehicle.

As shown in FIG. 8, the electric vehicle according to some implementations includes the battery module 100, a battery management system (BMS) 210, a vehicle control unit (VCU) 220, an interface unit 230, and a pressure detection unit 240.

The battery module 100 is charged by power supplied from the outside, and stores therein electric energy of a high voltage to supply an operation power to the electric vehicle. The battery module 100 includes one or more battery cells 111.

The BMS 210 checks a remaining current amount of the battery module 100, thereby determining whether to charge the battery module 100 or not. The BMS 210 manages supply of a charging current stored in the battery module 100, to each component of the electric vehicle. The BMS 210 may allow the electric vehicle to run for a long time by managing current usage, and includes a protection circuit with respect to a supplied current.

The BMS 210 prolongs a lifespan of the battery module 100 by preventing overcharge or over-discharge of the battery, by uniformly maintaining a voltage difference between the battery cells 111 inside the battery module 100 when charging and using the battery. The BMS 210 is connected to at least one battery cell 111 of the battery module 100, thereby controlling a voltage balancing according to a load applied to each battery cell 111.

The interface unit 230 includes an input unit for inputting a predetermined signal by an operator's manipulation, and an output unit for outputting information while the electric vehicle is running. The interface unit 230 includes one or more manipulating units for driving, such as a steering wheel, an accelerator, and a brake. The output unit may include a display unit for displaying information, a speaker for outputting music, an effect sound, and an alarm sound, and/or various types of lamps. The input unit may include a plurality of switches, buttons, etc. to operate a direction indicating lamp, a tail lamp, a head lamp, a brush, etc.

The vehicle control unit (VCU) 220 manages the battery module 100 by the BMS 210, and generates a predetermined command for executing an operation set in correspondence to an input applied to the interface unit 230. Then, the VCU 220 applies the predetermined command to the battery module, and controls input/output of data to display an operation state of the electric vehicle.

The pressure detection unit 240 serves as a sensor for measuring a pressure inside the battery module 100, and preventing excessive increase of the pressure inside the battery module 100.

In order to apply the battery module 100 to an electric vehicle, the electric vehicle includes the battery module 100 having a plurality of battery cells 111 and having an expansible member 113 provided between the battery cells 111 and laminated together with the battery cells 111; the pressure detection unit 240 connected to the battery module 100, and configured to measure a pressure inside the battery module 100; the VCU 220 configured to determine a state of the battery module 100 based on the pressure detected by the pressure detection unit 240; and the interface unit 230 configured to display the state of the battery module 100 determined by the VCU 220.

The VCU 220 determines whether to continuously use the battery module 100 or not. If the expansible member 113 is contracted out of a contractible range due to excessive expansion of the battery cells 111, then the VCU 220 stops using the battery module 100.

For example, when an expansive pressure of the battery cells 111 due to swelling is higher than a preset pressure, the VCU 220 controls usage of the battery module 100 to be stopped. This may help prevent the expansible member 113 from further being contracted out of a preset range, such as a contractible range or a thickness variable range of the expansible member 113, and being rendered ineffective.

In some implementations, the VCU 220 may also perform a diagnosis of the battery module 100, and display the diagnosis result on the interface unit 230.

As the present features may be implemented in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A battery module, comprising:
 a cell assembly comprising a lamination of a plurality of battery cells and one or more expansible members interspersed within the plurality of battery cells, the plurality of battery cells and the one or more expansible members being laminated in layers along a first direction; and a cell housing enclosing the cell assembly and forming an external appearance of the battery module, the cell housing comprising a first side that corresponds to a first end of the laminated layers of the cell assembly, and a second side that corresponds to a second end of the laminated layers of the cell assembly along the first direction, wherein the cell housing is configured to fix the first end and the second end of the cell assembly to inner surfaces of the first side and the second side of the cell housing, respectively, through pressure generated by a change in a thickness of the plurality of battery cells and the one or more expansible members along the first direction.

2. The battery module of claim 1, wherein the plurality of battery cells are longitudinally arranged along a second direction that is perpendicular to the first direction, and wherein the cell housing comprises:
- a first pressing plate and a second pressing plate covering the first end and the second end of the cell assembly, respectively;
- a first side plate and a second side plate covering a first side surface and a second side surface of the cell assembly respectively, and arranged perpendicular to a third direction that is perpendicular to both the first direction and the second direction, wherein the first and second side plates are locked by edge parts of the first and second pressing plates; and
- a front plate and a rear plate covering a first longitudinal end and a second longitudinal end of the cell assembly, respectively, and arranged in a direction that is perpendicular to the second direction, wherein the front and rear plates are locked by edge parts of the first and second pressing plates and by edge parts of the first and second side plates.

3. The battery module of claim 2, further comprising:
protrusions that are formed on the first and second pressing plates of the cell housing and that protrude in the first direction, and
bending portions that are formed on the first and second side plates and on the rear plate of the cell housing, and that are configured to be locked by the protrusions such that the first and second pressing plates are coupled to the first and second side plates and to the rear plate.

4. The battery module of claim 3, wherein the protrusions are formed along the edge parts of the first and second pressing plates, and the bending portions are formed along the edge parts of the first and second side plates and along edge parts of the rear plate.

5. The battery module of claim 4, wherein one or more thermal pads are provided between the cell assembly and at least one of the first side plate or the second side plate of the cell housing.

6. The battery module of claim 5, wherein the one or more expansible members are laminated in an alternating manner with the plurality of battery cells, and comprise a foamed member that is contractible and expandable according to an applied pressure.

7. The battery module of claim 3, wherein recess portions are formed in the protrusions of the first and second pressing plates of the cell housing, and are recessed inward toward the cell assembly, the recess portions configured to receive end portions of the bending portions of the first and second side plates, and wherein chamfers are formed on the first and second pressing plates, the chamfers forming an incline that extend outward from the recess portions and away from the cell assembly.

8. The battery module of claim 7, wherein bonding members are provided between the bending portions and the chamfers, the bonding members configured to fix the first and second side plates to the first and second pressing plates.

9. The battery module of claim 2, wherein insulation sheets are disposed between the cell assembly and the cell housing, the insulation sheets configured to provide electrical insulation for the cell assembly from an outside of the cell assembly.

10. The battery module of claim 2, wherein the plurality of battery cells and the one or more expansible members in the cell assembly are arranged as a plurality of cartridges, each cartridge having a first battery cell, a second battery cell, and an expansible member disposed between the first and second battery cells.

11. The battery module of claim 1, wherein the one or more expansible members have contractible thickness along the first direction, and the plurality of battery cells have expandable thickness along the first direction, and wherein an increase in the expandable thickness of the plurality of battery cells is compensated by a corresponding decrease in the contractible thickness of the one or more expansible members.

12. The battery module of claim 11, wherein the contractible thickness of the one or more expansible members has a range of 20% to 80% of a nominal thickness.

13. A method of manufacturing a battery module, comprising:
(a) forming a cell assembly by laminating a plurality of battery cells and one or more expansible members in layers along a first direction;
(b) applying an inward pressure to the cell assembly along the first direction by using pressing plates;
(c) coupling, to the pressing plates and in the pressed state of the cell assembly, side plates that are provided on side surfaces of the battery cells;
(d) removing the pressure applied to the cell assembly; and
(e) fixing the plurality of battery cells to the pressing plates through an outward pressure generated by a change in thickness of the plurality of battery cells and the one or more expansible members along the first direction.

14. The method of claim 13, wherein the plurality of battery cells and the one or more expansible members are laminated in an alternating manner along the first direction.

15. The method of claim 13, wherein the one or more expansible members have contractible thickness along the first direction, the plurality of battery cells have expandable thickness along the first direction, and an increase in the expandable thickness of the plurality of battery cells is compensated by a corresponding decrease in the contractible thickness of the one or more expansible members, and wherein the contractible thickness of the one or more expansible members has a range of 20% to 80% of a nominal thickness.

16. The method of claim 13, further comprising covering a front surface and a rear surface of the cell assembly with a front plate and a rear plate, respectively.

17. The method of claim 13, wherein the operation (c) further comprises:

forming protrusions at edge parts of the pressing plates, the protrusions configured to protrude toward away from the cell assembly;
forming bending portions at edge parts of the side plates; and
locking the bending portions of the side plates to the protrusions of the pressing plates.

18. The method of claim 17, wherein operation (c) further comprises:
forming recess portions in the protrusions of the pressing plates, the recess portions being recessed inward toward the cell assembly;
forming chamfers on the pressing plates, the chamfers forming an incline that extend outward from the recess portions and away from the cell assembly; and
forming bonding members between the bending portions and the chamfers, the bonding members fixing the side plates to the pressing plates.

19. The method of claim 13, wherein the side plates are thermal plates configured to discharge heat occurring from the battery cells to an outside of the cell assembly.

20. The method of claim 13, wherein coupling the pressing plates to the side plates in operation (c) comprises sliding the side plates in an engaged state to edge parts of the pressing plates.

21. The method of claim 19, wherein operation (c) further comprises inserting the thermal plates into the side plates.

22. An electric vehicle, comprising:
a battery module comprising a lamination of a plurality of battery cells and one or more expansible members interspersed between the plurality of battery cells, the plurality of battery cells and the one or more expansible members being laminated in layers along a first direction;
a pressure detection unit connected to the battery module, and configured to measure a pressure inside the battery module;
a controller configured to determine a state of the battery module based on the pressure detected by the pressure detection unit; and
an interface unit configured to display the state of the battery module determined by the controller,
wherein the controller is further configured to:
detect that the pressure inside the battery module detected by the pressure detection unit exceeds a threshold; and
based on a detection that the pressure inside the battery module exceeds the threshold, limit an operation of the battery module, perform a diagnosis of the battery module, and display a diagnosis result on the interface unit.

* * * * *